United States Patent [19]
Magill et al.

[11] Patent Number: 5,171,815
[45] Date of Patent: Dec. 15, 1992

[54] METHOD FOR PRODUCING DOUBLY ORIENTED POLYMERS

[75] Inventors: Joseph H. Magill, Pittsburgh, Pa.; Manivakkam J. Shankernarayanan, Schaumburg, Ill.

[73] Assignee: University of Pittsburgh, Pittsburgh, Pa.

[21] Appl. No.: 705,330

[22] Filed: May 24, 1991

Related U.S. Application Data

[60] Division of Ser. No. 593,343, Oct. 1, 1990, Pat. No. 5,047,347, which is a continuation of Ser. No. 275,707, Nov. 22, 1988, abandoned, which is a continuation of Ser. No. 922,035, Oct. 22, 1986, abandoned.

[51] Int. Cl.⁵ ............................................. C08F 10/00
[52] U.S. Cl. ............................ 526/348.1; 264/280; 264/288.4
[58] Field of Search .................. 264/280, 288.4; 526/348.1

[56] References Cited

U.S. PATENT DOCUMENTS
4,789,514 12/1988 Lo ........................................ 264/280

FOREIGN PATENT DOCUMENTS
215826 12/1984 Japan ................................. 264/280

*Primary Examiner*—Joseph L. Schofer
*Assistant Examiner*—David Wu
*Attorney, Agent, or Firm*—Reed Smith Shaw & McClay

[57] ABSTRACT

A process is disclosed for the solid phase preparation of doubly oriented synthetic polymeric material from an orientable amorphous but crystallizable or a semicrystalline thermoplastic polymeric workpiece comprising: (a) presenting the conditioned workpiece, at the entry mode of an opposing pair of solid rollers that are spaced apart a distance substantially less than the thickness of the workpiece; and (b) deforming the workpiece by compressive passage through the paired rollers at a nominal deformation ratios of at least 2 to 1. The deformation drawing is carried out between the glass transition temperature and the melting point of the polymeric material, by applying a draw tension insufficient to cause tensile failure of the workpiece.

4 Claims, 6 Drawing Sheets

METHOD FOR PRODUCING DOUBLY ORIENTED POLYMERS

This is a divisional of copending application Ser. No. 07/593,343 on Oct. 1, 1990, now U.S. Pat. No. 5,047,347, which is a continuation of U.S. Ser. No. 07/275,707 filed Nov. 22, 1988, now abandoned, which is a continuation of U.S. Ser. No. 06/922,035 filed Oct. 22, 1986, now abandoned.

BACKGROUND OF THE INVENTION

Polymers, by definition, are long chain molecules in which the atoms are bound to one another by means of strong covalent bonds. Hence one would expect exceptionally high strength and stiffness values in the chain direction since the applied load would then be opposed by the covalent bond themselves. On the contrary, most of the commercial polymers exhibit strength and stiffness values far below their theoretical limits. It is established that the modulus values of most of the commercial polymers are at least an order of magnitude less than their theoretical limits, thus severely limiting their use in many structural or load bearing applications. Therefore, the key to improved engineering properties lies in the preparation of highly chain extended/oriented polymers. As engineering materials polymers offer several advantages over metals and ceramics, in terms of high strength to weight ratio, cost efficiency, easy processability and improved corrosion resistance in many applications. See Table 1.

The need for oriented polymers has led to the development of several orientation techniques such as: solid state deformation of polymers, preparation of polymers with rigid chemical structures; and crystallization/fiber spinning from gels and dilute solutions. Much of the research in oriented polymers during the past two decades have been devoted towards an improvement and understanding of processing-morphology-property relations in uniaxially oriented systems. However, in the present invention, we are concerned with preparation of highly doubly oriented polymers from commercial plastics.

SOLID STATE DEFORMATION OF POLYMERS

Amongst the orientation techniques mentioned, solid state deformation of polymers has been extensively researched because of its technological and commercial importance.

A. Cold Drawing

This is the foremost amongst the various deformation techniques used in the preparation of highly oriented crystalline and amorphous polymers. Cold drawing is usually carried out by drawing the specimen on a tensile testing machine. The extent of drawing is highly dependent on deformation conditions such as draw temperature and speed, and also on material properties, such as molecular weight, molecular weight distribution, and to some extent on the initial morphology of the polymer. The method is limited in practise due to the batch nature of the process and its inability to process large sections of polymer.

B. Cold Extrusion

The process consists of forcing the solid polymer through a tapered die by means of a ram or plunger. The technique has been successfully employed in the preparation of highly oriented polyethylene, polypropylene and several other polymers. The limitations of this technique are (a) requirement of extremely high pressures for the attainment of high draw ratios; (b) appearance of cracks on the extrudate surfaces at high draw ratios; and (c) inability to process certain types of polymers.

C. Hydrostatic Extrusion

The process is very similar to cold extrusion except that the pressure is now transmitted through a fluid which surrounds the polymer. The pressure required for hydrostatic extrusion of polymers is much lower than cold extrusion. Still, it requires the use of high pressures which cause severe risks in commercial-level processing.

D. Die Drawing

In this technique oriented polymers are produced by drawing the billet through a converging die. Ward and co-workers* used this method to produce oriented polyethylene, polypropylene, and polyvinylidene fluoride.

* 1. J. Mat'l Sci., Vol. 15, (1980), pp. 979.
2. Polymer Vol. 20, (1979), pp. 1553.
3. J. Poly. Sci., Phys. Ed., Vol. 21, (1983), pp. 2525.

Widespread commercial use ⓒf the above techniques has been limited due to their batch operation nature, complex instrumentation, and their inability to process large billets of formed plastics.

E. Rolltrusion

This solid state deformation technique was developed by Applicant and co-workers for the preparation of doubly oriented polyethylene, polypropylene, nylon and polyester polymers from commercial plastics. The technique is relatively simple and is a continuous deformation, which is now shown as employable in the fabrication of highly doubly oriented polymers from such plastics. It overcomes the processing limitations imposed by die drawing, like fixed die dimensions, that limit the processing of large sheets and rods.

TYPES OF ORIENTATION

Conventionally, three types of molecular orientation can be introduced into any isotropic polymeric system:
  (A) Uniaxial Orientation—As the name suggests, there occurs preferential alignment of the polymer molecules along the direction of application of force. Typical processes which lead to uniaxial orientation are cold drawing and cold extrusion.
  (B) Biaxial Orientation—In this case, the polymer molecules are preferentially aligned along two different directions usually perpendicular to one another. Film blowing processes normally lead to biaxial orientation; and
  (C) Double Orientation—When an uniaxially oriented polymer is rolled under suitable conditions, one of the Crystallographic planes usually lies parallel to the molecular axis and becomes oriented parallel to the plane of rolling. Doubly oriented polymers may be produced in several ways, as illustrated in FIG. 1. Rolltrusion is a one step operation in our method, which is demonstrably more effective to achieve this orientation.

DOUBLY ORIENTED POLYMERS

Doubly oriented polyethylene, polypropylene, nylon 6, nylon 6,6, and some other polymers, have been produced by various researchers using mainly a two stage process. However, a detailed review of the literature has shown that these polymers have been employed mainly: (i) to detail the structural changes in oriented polymers upon deformation, and (ii) in basic morphological investigation of crystalline polymers. Very few have approached double orientation as a viable alternative for the preparation of high strength/modulus polymers in bulk; hence, the lack of systematic studies on processing-morphology-properties relations in doubly oriented polymers prior to the present invention. The mechanisms of deformations of semicrystallines are well known.

Applicant and co-worker investigated the processing-structure-property relations in doubly oriented polyethylene sheets up to draw ratios of about 30:1, and as high as 60:1 for polypropylene. See "Preparation of Highly Doubly Oriented Polymers"; (J. H. Magill et al., Jour. of Material Science Letters, 5, 267–269, March 1986). Applicant and other co-workers investigated the morphology in deformed polypropylene and propylene/ethylene block copolymers. See Prague Conference Proceedings on Polymer Morphology, July 1985.

The effect of draw temperature and draw speed on the deformation behavior were examined in an attempt to optimize the processing conditions for the preparation of highly doubly oriented polyethylene specimens. The doubly oriented samples exhibited enhanced transparency, increased molecular orientation along the deformation direction and increased melting point and degree of crystallinity. They obtained doubly oriented polyethylene samples with tensile strength values up to 50 ksi, a seventeen fold increase as compared to the original commercial polymer.

More recently, highly oriented polyethylene samples (presumably doubly oriented) have been produced by Kaito and co-workers (J. Appl. Poly Sci., Vol. 30 (1985) pp. 1241) using the roller drawing technique. They investigated the effect of draw ratio on the induced molecular orientation, melting characteristics and the mechanical properties of "roller-drawn" polyethylene thin strips. They thought roller drawing to be a useful procedure for producing high modulus and high strength HDPE sheets.

Uniaxial deformation behavior of polyethylene fibers (up to draw ratios of 22), approximately along the molecular chain axis direction, at various temperatures ranging between the room temperature and the melting point was examined by Wu et al (J. Poly. Sci., Phys. Ed., Vol. 18 (1980), pp. 751.) Brittle failure was reported at all test temperatures with no significant plastic deformation but much improved mechanical properties.

The present rolltrusion process is based on the following considerations:
(a) preliminary investigation had shown that the rolltrusion process can be employed in the preparation of highly oriented polymers;
(b) the technique is relatively simple, continuous and is capable of processing polymer continuously;
(c) the procedure has been attempted with a wide spectrum of polymers, e.g., polyolefins, polyamides and polyesters; and
(d) moreover, the technique produces double orientation, i.e., the crystallographic directions are usually well aligned with respect to the deformation directions (during extension and compression) throughout the sample, as compared to uniaxial orientation obtained by other deformation processes. There is, however, some dependence of orientation on the molecular weight of the sample.

OBJECTS OF THE INVENTION

An object of the present invention is to provide a deformation technique which can be employed for the preparation of highly doubly oriented polymers from commercial plastics. More specifically, its function is to understand the relationship between the macroscopic processing conditions, the induced morphological transformations and the observed mechanical properties. The process was developed in the following phases:
(a) preparation of highly doubly oriented polymers under varying macroscopic processing conditions, i.e., draw temperature, draw speed, roll gap, in addition to molecular weight and draw ratio;
(b) making morphological characterizations of these doubly oriented polymers by the analytical techniques of WAXD, SAXS, DSC, Birefringence, SEM, TEM, and GPC (all explained below); and
(c) determination of mechanical properties of the deformed polymers, i.e., tensile strength, tensile modulus, percent elongation (to break) toughness, and clarity.

In Table 2 is seen an outline of the broad processing, polymer morphology and property correlations for doubly oriented polymers.

Both high density polyethylene and isotactic polypropylene were examined, based on the commercial importance of the polymers, and because of their extensive use in the preparation of oriented films and sheets for packaging and membrane applications, to cite some examples. Yet, other semi-crystalline polymers can benefit from the present process, such as Nylon 6, polyacetal and fluoro-substituted vinyl polymers.

SUMMARY OF THE INVENTION

Commercial grade polyolefins, and other polymers, were doubly oriented in a single operation named, rolltrusion, to produce highly transparent semicrystalline doubly-oriented* specimens. The process may be performed stepwise, or continuously, and the sample size produced is only limited by the practical dimensions of the roller and wind-up arrangement used to receive the processed workpiece. One schematic of the rolltrusion process is shown in FIG. 2.

* This signifies a triaxial crystallite orientation within an oriented amorphous load bearing matrix, unlike biaxial orientation with which it is often confused.

The Young's moduli of HDPE and iPP doubly-oriented specimens prepared by this procedure Were enhanced x25 and x15 times, respectively, over that for the original polymers received from the manufacturer. Tensile strength of these products were significantly improved at least x8 (HDPE) and x30 (iPP) over the original polymer. Draw ratios of x30 for HDPE and x60 for iPP have been obtained. Moreover, extensive morphological characterization conducted using WAXS, SAXS, SEM, birefringence, etc., demonstrated that the polymer crystallites in the rolltruded HDPE and iPP sheets were oriented with the molecular c-axis along the draw direction, while low index plane was parallel to the roll surface of the workpiece for high draw ratios.

This "two phase" morphology with triaxial crystal symmetry shows many potential applications industrially. From DSC traces, it was established that the melting temperature, the sharpness of the melting peak, and the degree of crystallinity all increased with increasing draw ratio. GPC measurements (made before and after processing) confirmed that the commercial plastics did not undergo thermomechanical degradation during processing. The considerable advantages of the rolltrusion technique compared with other currently used solid state deformation techniques are shown.

The conditioned plastic workpiece is deformed in its solid state by passage through the roller (either fixed or rotating) at a nominal deformation of at least 2:1, by means of drawing the workpiece from the downstream end of the rollers. It is simultaneously compressed and drawn in a single pass under processing conditions (draw temperature, speed and ratio), to produce doubly oriented polymer, of good quality and improved mechanical properties, such as tensile strength, tensile modulus, enhanced creep resistance, and based on the triaxial orientation induced by the disclosed rolltrusion process. The wear resistance and other practical aspects of plastic material properties have been measured and thus shown to be improved by the present invention.

The material produced has a triaxially oriented, two-phase morphology. This was characterized by conventional molecular orientational analytical methods for assessing the effect of processing condition on mechanical properties. Good quality processed polymers with greatly enhanced properties were obtained and characterized.

The procedure has now been applied to many plastics producing materials with enhanced moduli and tensile strengths, and higher toughness, double-orientation, crystallinity enthalpy, crystallite size, and so on. Correlations between properties and macroprocessing steps have been established and are optimized through process modeling protocols presented below.

According to the invention, the polymer workpiece is preferably preconditioned to a temperature below its melting point, but above its glass transition temperature, to insure a high enough draw ratio that will affect double orientation. Preconditioning is conducted in its solid state to a range of 0° to 300° C., so that the deformation may be carried out at least 20° C. below the thermodynamic melting point. For example, with polyolefin plastics, this lies in the practical range between 0° and 160° C. For polyethylene specifically, the draw temperature used was in the range from 20° to 125° C., permitting a maximum draw ratio ranging from 5 to 30.

The draw speed was varied tenfold, ranging from 2.6 to 30 mm. per minute, but draw speed did not appreciably effect the draw ratio, which was found to be largely independent of draw speed in the ranges studied herein. With preheating, draw speeds up to 10 meters per minute are practical. By preheating the workpiece before the inlet to rollers, considerably higher speeds are obtainable.

It is practical to use draw speeds greater than several meters min$^{-1}$; indeed, speeds of up to 10 meters min$^{-1}$ can be usefully employed preferably in the range of 1 cm to one meter/min.

For isotactic polypropylene, the draw temperature is in the range of 120 to 160° C., permitting a draw ratio ranging from 12.5 at 140° to a draw ratio of 60 at rollers temperature of 158° C. Again, draw ratio was essentially independent of the draw speed, which was in the range 2.6 to 26 mm. per minute. Generally, useful draw ratios range between 5 and 60. The maximum draw ratio usable for a polymeric workpiece is effected by increasing the preconditioning and rollers temperatures up to a level clearly below the observed melting point of the workpiece conveniently at least 20° C. below the melting point. Draw speeds of up to 100° mm. per minute are employable with heated rotating rollers.

As for the degree of compressive passage between the rollers, the nominal deformation ratio of the fed billet should be at least 2 to 1. The draw tension at the exit side of the rollers (largely achieved by increasing the draw speed) should be sufficient to effect a draw ratio of at least 6.5 to 1, ranging as high as 60 to 1 and above with the polypropylene material, wherein the optimum mechanical properties are gained. This is evidenced by the tensile modulus, tensile strength elongation-at-break and birefringence data presented in the tables. For HDPE a draw ratio of about 22 was used; and for IPP, a draw ratio of about 35 gave the best balance of physical properties for the thusly doubly oriented workpiece.

BRIEF DESCRIPTION OF THE DRAWING

The invention will now be more particularly described, by way of example, with reference to the accompanying drawings, in which:

FIG. 2 illustrates the rolltrusion design which basically consists of a pair of thermostatted rollers and a wind-up device to tension and draw the polymer static or rotating specimen. The specimen or the workpiece is compressed simultaneously as it is passed through the rollers. The specimen may also be preheated using an external device depending on the type and size of the polymer workpiece. In fact, in some circumstances, the overall assembly may be a modified conventional metallurgical metal rolling or processing machine. Whether the rollers are fixed or rotating, the compressive force in the roller gap, coupled with the tensile (drawing) force, induces high-deformation, so that a highly doubly oriented specimen is produced under steady state processing conditions.

Figure 1:
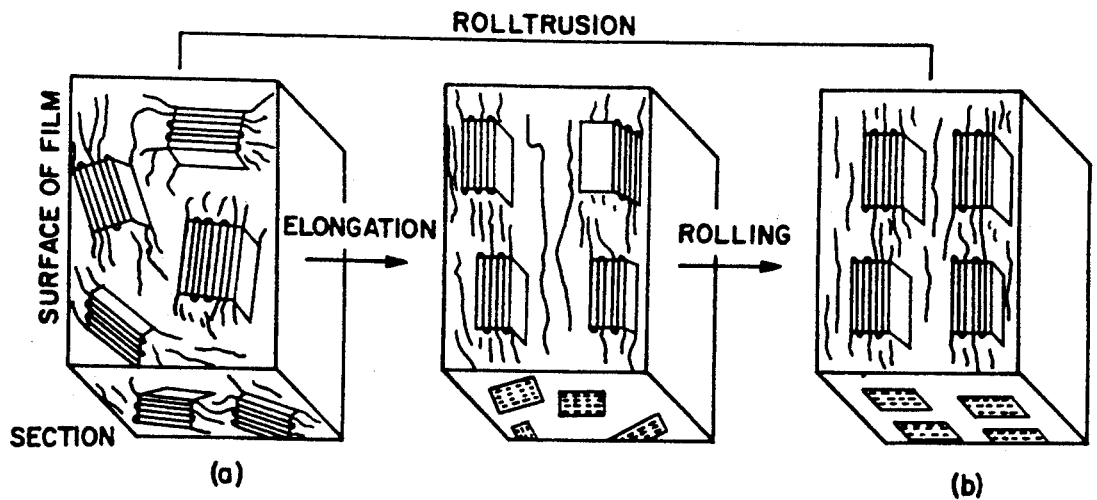
FIG. 1 is schematic of changes effected in morphology by rolltrusion.

One advantage of the rolltrusion procedure over all methods lies in large specimen size (widths and lengths), which can be produced continuously when required. In these circumstances not only do the polymer molecules undergo a very high degree of preferential alignment along the direction of application of tensile force, but one of the crystalline planes of the crystallites becomes oriented parallel to the rolling plane. This morphology is triaxial symmetry (single crystal-like). The anisotropy of various physical properties such as thermal resistance, electrical conductance, etc., in three axial directions can thus be controlled by the processing constraints applied to the workpiece. The rolltrusion process has now opened up a new field of technology and applications for high-modulus commercial materials of moderate to high molecular weights.

According to the present invention, there is provided a process for the solid phase deformation of a workpiece of an orientable thermoplastic polymer, which process comprises: preconditioning the workpiece in its solid state at a temperature in the range between Tm and Tg, providing the conditioned workpiece, of the essentially unoriented polymer at the entry side of an opposing pair of rollers spaced apart a distance substantially less than the thickness of the workpiece; applying to the workpiece from the exit side of the rollers a draw tension insufficient to cause tensile failure of the workpiece, but sufficient to effect a draw ratio of at least 2 to 1, and upwards.

The term "workpiece" as used herein includes bars, strips, rods, multifilaments, and other cross-sections of solid stock. The term includes both billets and other form of stock of greater length; indeed, continuous stock, which may be formed as the process is performed, may be utilized: examples include a polymer sheathed continuous core such as a metal wire, or continuous polymer rod, film or filaments.

The term "essentially unoriented" as used herein means that the workpiece has incurred no orientation other than that minor amount which might be induced during formation of the workpiece, for example during billet molding or melt extrusion, or during any subsequent shaping thereof, for example, by machining, prior to the performance of the die drawing process of this invention.

The orientable thermoplastic polymer is desirably a semicrystalline, or potentially crystallizable amorphous polymer, especially one which exhibits sufficient strain hardening and strain rate dependence of the flow stress to stabilize the neck formed under the desired drawing conditions. Preferred such polymers are suitably of a homo- or copolymer of ethylene, or propylene with at least one comonomer; a vinylidene fluoride polymer, a polyacetate, a polyamide, a polyester or (poly) esteretherketone (peek). Both linear and somewhat branched polymers may be processed.

PREFERRED EMBODIMENTS OF THE INVENTION

Material

The commercial-grade high-density polyethylene (Boltaron 5200) and isotatic polypropylene (Boltaron 5500/5501) evaluated were supplied by the GTR Plastics Company, Ohio, U.S.A. (The physical and mechanical properties of the original HDPE and iPP polymers are given in Table 3.)

Sample Preparation

For demonstrating the processing described here the original HDPE and iPP stock sheets were cut into long billets of 48 inches (ranging in cross-sections from 0.5"×0.5" to 0.15"×0.15" approximately). Billets of required dimensions were cut from the original stock sheets. The surfaces of the cut billets were subsequently milled with a carbide steel fly wheel to yield desired sample thickness.

Doubly oriented polymer samples were prepared by means of the rolltrusion process. The front end of the polymer sheet or billet was inserted between the processing rollers and then connected to the variable speed wind-up supplying a constant load. Initially start-up was manually slow until the desired roll gap (specimen thickness) was established. Thereafter, the draw speed was adjusted to produce a stable uniformly thick product after passage through the rollers at a steady rate.

Preparation of Doubly Oriented Polymers

The process of double orientation may be carried out in one or two stages.

One of the methods of defining draw ratio for the oriented polymers workpiece is determined as follows:

$$\text{Draw Ratio} = \frac{\text{Original cross-sectional area of the billet}}{\text{Final cross-sectional area of the product}}$$

Table 4 lists the processing conditions used in the preparation of doubly oriented HDPE and iPP polymers, defined in Table 3. Doubly oriented polymers with varying draw ratios can be obtained by the proper choice of draw temperature, draw speed and roller nip dimensions.

Analytical Techniques Used in Polymer Evaluation Morphology

A. Wide Angle X-ray Scattering (WAXS) The wide angle X-ray diffraction patterns were obtained using a Statton-type vacuum camera. The samples were exposed to Nickel filtered Cu $K_\alpha$ radiation for 4–5 hours at 35 KV and 12 mA. The sample to film distance was 47.35 mm. The diffraction patterns were obtained with X-rays parallel and perpendicular to the roll direction. The samples were scanned at a rate of 0.2°/min. using Cu K$\alpha$ radiation of 40 KV and 25 mA. A 1° beam split and graphite monochromator were used.

Figure 3:
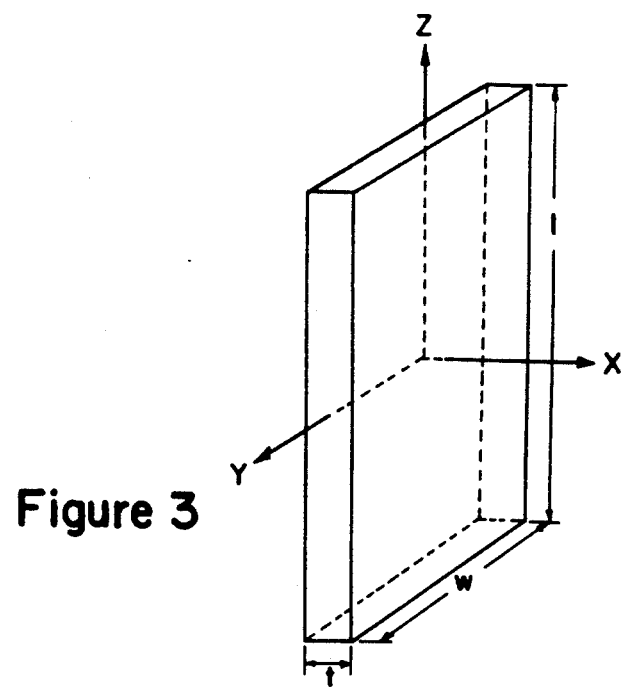
FIG. 3 shows the coordinates of doubly oriented specimens. Draw or machine direction is Z, roll plane is YZ, and transverse load is in X direction.

The average orientation of the crystallites (c-axis orientation) with respect to the roll direction was estimated using the Hermann's orientation function. The crystallite orientation factor was determined using the WAXD azimuthal scanning data obtained from (i) (200) and (020) reflections for HDPE and (ii) (040) and (110) reflections for iPP polymers respectively. The data was obtained with the X-rays parallel to the X direction, which is parallel to the directions of rolltrusion. Note that measurements were also made in the Y and Z directions too in order to establish sample orientation of the extrudate (See FIG. 3)

B. Small Angle X-ray Scattering (SAXS) The changes in long period spacing or average crystallite size were determined using the small angle X-ray scattering technique (SAXS). The SAXS measurements were carried out using a Rigaku-Denki camera and a rotating anode generator. Nickel filtered Cu K$\alpha$ radiation was used through the X-ray work. The samples were exposed for 4–5 hours at 40 KV and 50 mA. The sample to film distance was 480 mm. The samples were photographed with the X-ray beam parallel to the X and Y directions. The long period spacing was calculated.

C. Differential Scanning Calorimetry (DSC) A Perkin-Elmer differential Scanning Calorimeter (DSC-2), with scanning auto zero and computer integration accessories, was used to determine the melting characteristics and the heat of fusion of the original and deformed polymers. The calorimeter was initially callibrated for temperature measurements using a standard Indium sample (Melting pt. 156.0° C. and $\Delta H_f = 6.8$ cals/gm), and other standards. All the measurements were made at a fullscale sensitivity of 10 m cal/sec. and at a scan rate of 10°/min. The melting point was directly determined from the DSC curve by reading the temperature corresponding to the peak maximum of the endothermic traces. The heat of fusion was obtained by integrating the area under the melting peak of the DSC curve. Then the degree of crystallinity of the sample was computed by conventional techniques using the heat of fusion data of 100% crystalline samples. Crystallinity was also determined from density measurements.

D. Birefringence

Birefringence measurements were carried out using a Leitz-Ortholux microscope equipped with a green line ($\lambda = 546$ nm) interference filter, a rotary sample stage and Berek compensator. Lipshaw Model 45 Rotary Microtome was used to microtome thin slices of the polymer from the doubly oriented strips. Measurements were made with the incident light parallel to the Y and Z directions.

The birefringence data and WAXS measurements were used to determine the amorphous orientation factor, $f_a$. The intrinsic birefringences of single crystals of HDPE and iPP samples were taken to be 0.060 and 0.030, respectively, while the intrinsic birefringence of the amorphous phases of these polyolefins was assumed to be 0.20 for HDPE and 0.061 for iPP, respectively.

E. Electron Microscopy

Fracture surface morphology of doubly oriented polyethylene and polypropylene polymers along various directions were examined using a JOEL JSM-35 Scanning electron microscope. Morphological characterization of ion-etched polymeric surfaces were carried out. Ion-etching was carried out in a JOEL-JFC 1100 ion sputtering instrument at 500 volts (AC) and 3 mA in air at a chamber pressure of 26.7 Pa for 30 minutes. All samples for scanning electron microscopy were coated with either Au or Au/Pd. Electron diffraction studies were made on thin layers of polymer detached from the surfaces of the ion-etched polymers using gelatin as the adhesive. Orientation, determined in the x, y and z directions of the samples, were consistent with x-ray studies mentioned in section A, showing that the rolltrusion process induced double orientation. Replication of the surfaces for the transmission electron microscopy studies were made using carbon backing.

F. Gel Permeation Chromatography

The molecular weight and the molecular weight distribution data on the original and the highest drawn polyethylene and polypropylene samples were provided by Chisso Corporation, Tokyo, Japan.

G. Mechanical Properties

Tensile properties of the doubly oriented polyethylene and polypropylene specimens were determined using a table model Instron Tensile Testing Equipment (Model 4042) equipped with a strip chart recorder and a microprocessor. The tensile testing of doubly oriented HDPE and iPP samples were conducted under the following conditions: test temperature—room temperature (~23° C.); gate length—1.0 and 2.0 ins for the HDPE and iPP samples, respectively; and cross-head speed—0.2 in/min., to comply with ASTM Standard procedures.

Where it is intended to utilize the process of this invention to produce a product with enhanced tensile modulus, tensile strength, percent elongations, and toughness, then a workpiece of a homo- or copolymer of ethylene should desirably comprise a polymer having a weight average molecular weight ($M_w$) less than 5,000,000, suitably from 50,000 to 500,000, preferably from 70,000 to 400,000; one of a linear homo- or copolymer of propylene should desirably comprise a polymer having a $M_w$ from 150,000 to 800,000, preferably from 250,000 to 500,000.

However, the process of this invention may also be performed, to provide a more advantageous forming procedure for a workpiece of an essentially unoriented but orientable, polymer; or from an amorphous, but crystallizable polymer, orientable or semicrystalline, ultra high molecular weight polymer (for example, a linear homopolymer of polyethylene terephthalate having a $M_w$ of 30,000 to 50,000). It may likewise be utilized, if polymers are prepared in relatively low crytallinity, through side chain branching or quenching, or solution precipitation.

The draw ratio should be sufficient to draw the workpiece through the rollers but insufficient to cause tensile failure of the article; that is, the draw ratio should be such that the true stress at any point in the workpiece during processing does not exceed its fracture stress at that point. A suitable maximum value of draw ratio has been determined based on the data of FIG. 4. Sample molecular weight, and molecular weight distribution affect the draw ratio that is obtainable.

For a particular polymer, a steady state process is obtained for a given set of temperature, draw speed and deformation conditions (draw) ratio. These parameters vary implicitly, but it has been found possible, for a particular polymer, to set the rollers temperature (which will be only a nominal temperature for the polymer, since the process is not an isothermal one) and the workpiece shape, and to vary, the draw speed to obtain the desired draw ratio.

For homo- and copolymers of ethylene and/or blends of polyethylene, the rollers temperature may be desirably set at a temperature just above the lowest glass temperature (of the system) and preferably not above melting temperature of the highest melting component of the system. More particularly, for such polymers of $M_w$ from 50,000 to 150,000, the rollers temperature is preferably from 70° C. to 130° C. For linear homo- and copolymers of polypropylene, of weight average molecular weight from 150,000 to 800,000, the rollers temperature may be set from 20°–170° C., preferably 90°–160° C. A roller temperature of 80°–170° C., preferably 120°–160° C., is suitable for homo- or copolymers of ethylene and propylene, and of 80° C. to 180° C. is suitable for vinylidene fluoride polymers. The polymer temperature may be further controlled by utilizing rollers.

The advantages of the process of this invention over die and hydraulic drawing will become manifest to those skilled in the art. First, it obviates the necessity of a batch process and dispenses with use of expensive and potentially hazardous hydraulic pressure equipment. It is also found that, and in contrast to hydrostatic extrusion, the throughput increases with increasing deformation ratio.

DRAW TEMPERATURE

The proper draw temperature was found as essential for the attainment of high draw ratios. Solid state deformation of crystalline polymers can be carried out at any temperatures ranging between the glass transition temperature and just below the melting point of the polymer. Usually, the deformation of crystalline polymers was accomplished at temperatures 5° to 30° C. below their melting point.

In Tables 5 and 6 are presented data on, the variation in maximum draw ratios with the draw temperature for high density polyethylene and isotactic polypropylene, respectively. From the data, it is evident that the maximum draw ratio increases with increasing roller temperatures. In the case of iPP, it was possible to obtain a draw ratio of 35.0 at the roller temperature of 158° C., compared to a draw ratio of 5.0° at 130° C. Similarly, for the HDPE polymer, the draw ratio increased from 6.5 to 22.0 on raising the draw temperature from 100° C. to 120° C. Higher values have been attained. Any attempt to draw the billets beyond determined maximum draw ratios led to the specimen failure in the indicated processing ranges for the specimens of this example.

The data indicate that higher temperatures lead to lower draw stress for a given draw ratio. For HDPE polymer, draw stresses of 4100 psi and 2000 psi were required to obtain a draw ratio of 10.0 at 110° C. and 120° C., respectively. For iPP, draw stresses of 7200 psi and 3500 psi were required to obtain a draw ratio of 15.0, at 150° C. and 158° C., respectively.

DRAW SPEED

The draw speed corresponds to the constant rate of the wind-up device used in processing.

Plots of data on draw ratio as a function of applied draw speeds for the HDPE and iPP specimens of Table 3 indicate that the draw ratio is independent of the draw speed in the range of this disclosure. These results are in agreement with other observations made at comparable draw speeds.

OPTICAL TRANSPARENCY

Commercial HDPE, iPP, and other polymers are opaque to visible light. This is due to scattering of light by the spherulitic structures and voids in those polymers. In contrast, the doubly oriented polyethylene and polypropylene produced were highly transparent, apparently because the spherulites are destroyed during processing, and they are converted into well-ordered crystalline domains with dimensions less than the wavelength of light as verified by small angle X-ray scattering measurements.

INTERPRETATION OF DATA ADDUCED ON MORPHOLOGY

Wide Angle X-ray Diffraction (WAXD)

The wide angle measurements were made primarily: (i) to follow any polymorphic transitions in HDPE and iPP upon double orientation, (ii) to confirm the double orientation texture in the processed polymers, and (iii) to quantitatively determine the average crystallite orientation in the roll direction.

The diffraction patterns of the original HDPE and iPP polymers were recorded using a Statton-type camera. Both patterns consist of concentric rings indicating no preferred orientation in any direction. The HDPE pattern was indexed with reference to an orthorhombic unit cell. The iPP pattern was indexed as the monoclinic structure.

Small Angle X-ray Scattering (SAXS)

Small angle X-ray scattering refers to diffraction of X-rays at Bragg angles less than 2-3 degrees. The SAXS measurements were carried out to investigate the changes in long period spacing upon double orientation. The long period spacing is a measure of the average crystalline size in crystalline polymers, since it includes the dimensions of both the crystalline and the amorphous regions.

Table 7 lists the long period spacing values obtained from some of the doubly oriented HDPE and iPP samples processed at various conditions and of draw ratios up to X10. From the Table it is evident that average crystallite size is highly dependent on the draw ratio and draw temperature. The long period spacing was found to increase with increasing draw ratio and draw temperature. The original HDPE and iPP samples showed long period spacing values of 170 and 180 A, respectively. For doubly oriented iPP samples, the long period spacing increased from 180 A to 247 A, as the draw ratio increased from 1 to 10. Similarly, for HDPE samples the long period spacing values increased to 269 A (DR=10) upon double orientation. In fact, at very high draw ratios such as x60 for polypropylene, the discrete SAXS reflection often disappear or can only be observed with difficulty.

Differential Scanning Calorimetry

The DSC technique has been employed extensively in the thermal analysis of amorphous and crystalline polymers. In the present specification, the technique was used to determine the changes in: (i) the melting characteristics upon double orientation, (ii) the degree of crystallinity based on heat of fusion values, and (iii) distribution of crystallite sizes from the nature of melting profiles.

The melting profiles of the original and the doubly oriented HDPE samples at draw ratio of 22, and the doubly oriented iPP specimens (DR=20 and 35), were plotted. Doubly oriented HDPE samples showed single melting peak, while iPP specimens exhibited multiple melting peaks. It was also observed that the doubly oriented HDPE samples exhibited relatively narrow melting profiles as compared to the original commercial polymer.

Table 8 presents the melting point data on doubly oriented HDPE and iPP samples (K°). The original HDPE and iPP samples had a melting point of 133.5° and 161.0° C., respectively. For doubly oriented HDPE samples, a plot of melting temperatures, as a function of draw ratios was also made. It showed the peak melting temperature increased to 138.5° C. upon increasing the draw ratio to 22. Similarly, the iPP specimens, the low melting peak increased from 161° C. to 165.5° C. (DR=35) upon double orientation. The high melting peak in double oriented iPP samples occurred around 172° C.

Birefrigence

Birefringence, $\Delta n$, is defined as the difference in refractive index parallel $n_{\|}$, and perpendicular $n_{\perp}$ to the draw direction for a uniaxially oriented polymer.

The refractive index in any given direction is related to the polarization properties of the macnomolecule in that direction. The birefringence values in all three principal directions are needed to completely characterize the state of molecular orientation in a crystalline polymer. The characterization can be carried out in all three directions, only if one has either a single crystal or a doubly oriented polymer, which possess a pseudo single crystal-like morphology.

The birefringence values along the YZ and XZ directions (FIG. 3) of the doubly oriented HDPE and iPP polymer samples were determined by standard procedures.

Gel Permeation Chromatography

Gel permeation chromatography (GPC) measurements were made mainly to monitor the changes in molecular weight and molecular weight distribution in commercial HDPE and iPP samples upon rolltrusion. The GPC data and the GPC curves obtained from the original and the doubly oriented HDPE samples (DR=20) were studied. A comparison of the curves shows no significant changes in the molecular weight distribution upon double rolltrusion orientation. The GPC traces for the original and the doubly oriented iPP specimens (DR=35) were studied. Again, no change in the molecular weight distribution in iPP upon orientation was noted.

Table 9 lists the number average molecular weight ($M_n$), the weight average molecular weight ($M_w$), and the polydispersity values ($M_w/M_n$) for the original, and for the doubly oriented, HDPE and iPP specimens. The commercial HDPE polymer had $M_n$ and $M_w$ values of 13,900 and 91,900 respectively, while the doubly oriented HDPE (DR=20) showed $M_n$ and $M_w$ values of 11,300 and 91,200, respectively. Similarly for iPP, within the experimental error, no applicable change in number average and weight average molecular weight were observed (Table 13). The results indicate that both the number average ($M_n$) and the weight average molecular weight ($M_w$) for the HDPE and iPP polymers do not change significantly upon processing. Therefore, the commercial HDPE and iPP samples did not undergo any thermo-mechanical degradation upon double orientation.

Processing Conditions

Figure 4:
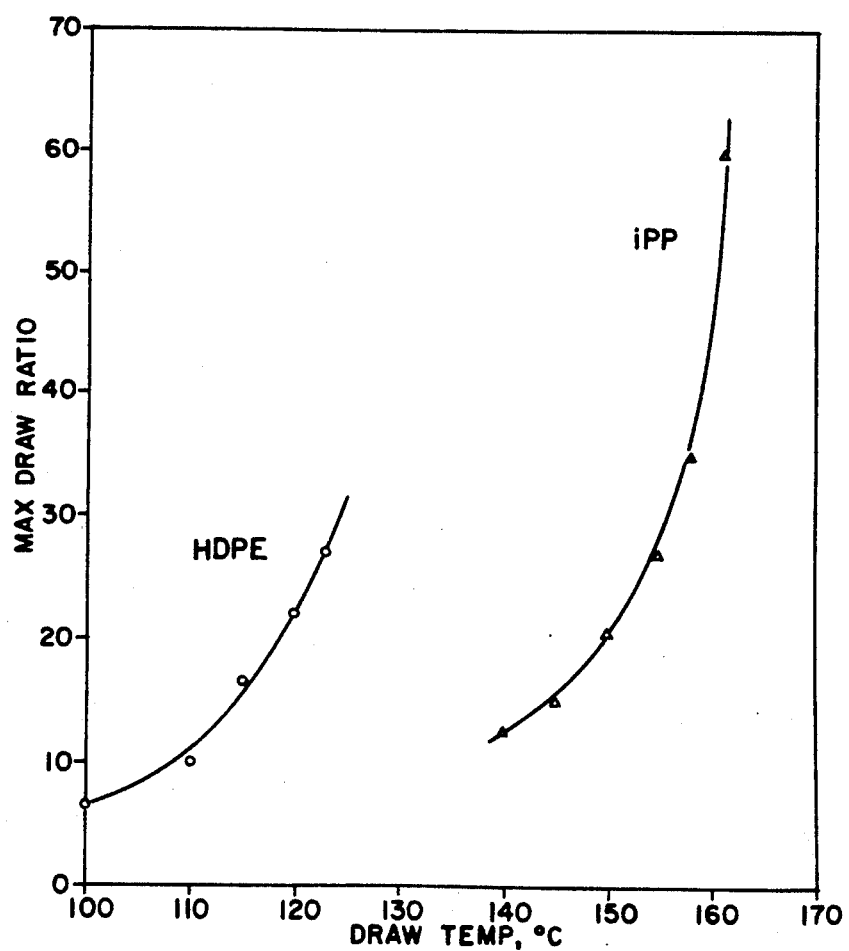
FIG. 4 presents the maximum draw ratios obtained as a function of draw temperature for HDPE and iPP sample of specified molecular characteristics.
Figure 6:
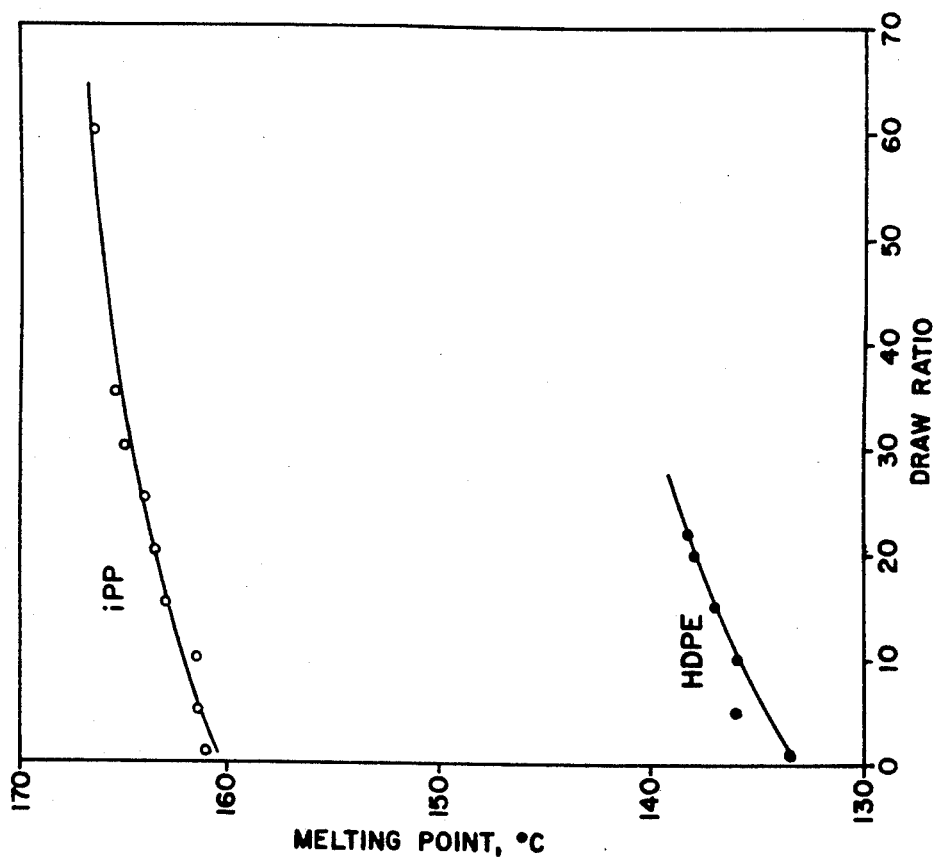
FIG. 6 is a plot of (a) Melting point dependence of HDPE with increasing draw ratio, and (b) Melting point of lower peak for iPP with draw ratio.

Processing temperatures of 100°, 100°, 115°, 120° and 123° C. for HDPE samples, and 140°, 145°, 150°, 155°, 158° and 160° C. for iPP samples were selected to illustrate the effects of processing temperature on properties. These conditions ensured that molecular mobility, and molecular alignment and extension, occurred in the workpiece well beyond the natural draw ratio attainable in either of these polyolefins. For each draw temperature, presumably a maximum draw, $DR_{max}$, ratio should be reached, beyond the point failure of the specific workpiece in question. $DR_{max}$ is peculiar to the molecular characteristics of state of the workpiece being studied. The results of $DR_{max}$ as a function of draw temperature are shown in FIG. 4 for HDPE and iPP samples, respectively.

From these curves, it is evident that $DR_{max}$ increases with increasing roller temperatures for a fixed specimen cross-section. For iPP, a draw ratio of 60 for Tp=160° C. is to be compared with a $DR_{max}$ of 5 for Tp=130° C. These are not necessarily optimum working conditions, but only reflect conditions suitable for highly doubly orienting the commercial polyolefins employed in this particular study. No evidence of surface melting of the workpiece was observed at the highest temperatures (123° C. for HDPE and 160° C. for iPP). Therefore, these two temperatures are not considered to be the upper limits for rolltrusion. Note too, that the temperature rise in the workpiece during processing is insignificant.

The maximum draw stress along the deformation path, determined by the ratio of drawing load to final cross sectional area of the specimen, was found to be dependent on both draw ratio and draw temperature. For example, the maximum draw stress employed for HDPE ranged from 720 to 6200 psi at 120° C. For iPP at 158° C., the draw stress ranged from 150 psi to 22,300 psi. At each temperature, the draw stress tended to rise almost exponentially at high draw ratios, prohibiting further deformation and causing product breakage at times. In the present example, draw speed was also varied from 2.6 mm/min to 26 mm/min. Neither draw ratio nor draw stress was significantly affected within this speed range.

The necked profiles of the polymer specimens were examined during and after drawing. The rolltrusion products had a smooth surface, uniform thickness and high transparency. It is also important to note that dimensional changes of the workpiece were minimal in the rolltruded polyolefins.

Mechanical Properties

Figure 2:
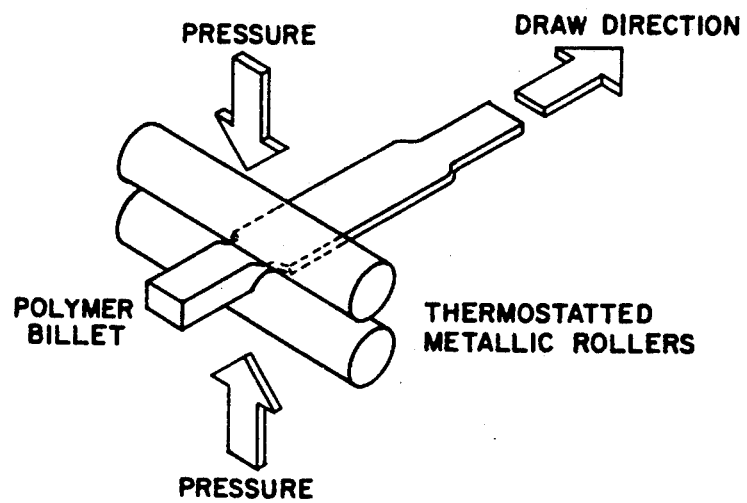
FIG. 2 is a schematic of a rolltrusion apparatus for double orientation of polymer billets.

The tensile properties of the specimens reported here were determined along the draw direction (FIG. 2). In the tensile test, the unoriented polymers showed a yield point, followed by formation and propagation of the neck region, while all of the doubly oriented HDPE and iPP samples exhibited considerably less extendable behavior, especially at high DR values.

Figure 5:
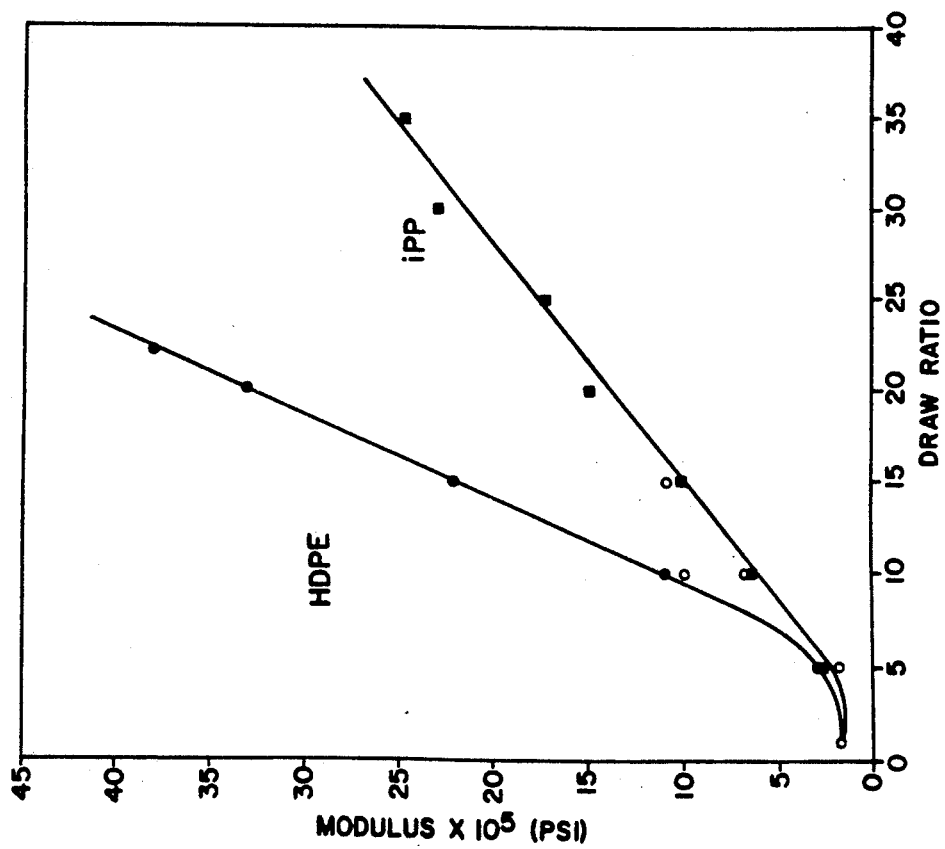
FIG. 5 presents the plots for Young's modulus for HDPE and iPP as a function of draw ratio.

The Young's modulus, obtained for HDPE and iPP samples is plotted in FIG. 5 as a function of draw ratio. The Young's modulus of HDPE polymers was enhanced by more than 20 times, i.e., from $1.7 \times 10^5$ psi (1.2 GPa) for the original polymer, to $3.8 \times 10^6$ psi (26 GPa) for the highly doubly oriented HDPE sample (in this instance a DR=22). Almost a linear increase in Young's modulus values was noted with increasing draw ratio. A significant increase in modulus was also observed for iPP samples. The Young's modulus of the original iPP sample was $1.8 \times 10^5$ psi (1.2 GPa) while a highly drawn iPP sample (DR - 35) had a value of $2.5 \times 10^6$ psi (17.2 GPa). Young's modulus is found to be a unique function of draw ratio for the range of draw temperatures and draw speeds used here.

Tensile strengths follow a trend with draw ratio similar to Young's moduli. More importantly, tensile factor may be strongly correlated with amorphous orientation factor, $f_a$, (FIG. 11), which provides a more meaningful correlation parameter than does $f_c$, conventially used. Elongation at break was considerably reduced at high draws ratio implying that the creep properties of these doubly oriented polyolefins were greatly enhanced through rolltrusion.

Wide Angle X-Ray Diffraction

HDPE and iPP are known to exist in several crystallographic forms. HDPE is predominantly orthorhombic and sometimes it occurs in the less stable monoclinic form. The iPP polymer is usually monoclinic form and it sometimes forms a hexagonal crystal structure. The data showed typical diffraction patterns of the unoriented original HDPE and iPP polymers indicating no preferred orientation in any direction. The HDPE pattern was indexed with reference to an orthorhombic unit cell, while the iPP patterns obtained from HDPE samples of various draw, ratios, DR=10, 15 and 22, recorded perpendicular to the YZ and XZ planes, respectively. The diffraction patterns were indexed with respect to orthorhombic and monoclinic forms of HDPE.

The data illustrated the diffraction patterns recorded in transmission for the original and a highly doubly oriented HDPE sample with the X-ray beam perpendicular to the YZ and XZ planes. The intensity of the (110) reflection increases with increasing draw ratio. It is found that the intensity of the (200) reflection decreased with increasing draw ratio in YZ patterns but increased with draw ratio in XZ patterns.

These observations illustrate that during deformation, the crystallites in the HDPE samples of moderate molecular weight, rotate so that the (110) plane is aligned parallel to the rolling plane (i.e., YZ plane). This type of deformation has been reported in a few other investigations and can be explained as (110) twinning. A similar analysis for iPP monoclinic structure obtains. WAXD's show typical patterns recorded for a doubly oriented iPP sample (DR=35) perpendicular to the XY, YZ and XZ planes. Molecules are preferentially oriented along the draw direction. The (110) plane is parallel to the roll surface, and the (040) plane along the transverse direction (Y direction), in doubly oriented samples having high draw ratios. (>X35)

Differential Scanning Calorimetry—Crystallinity Values

Figure 7:
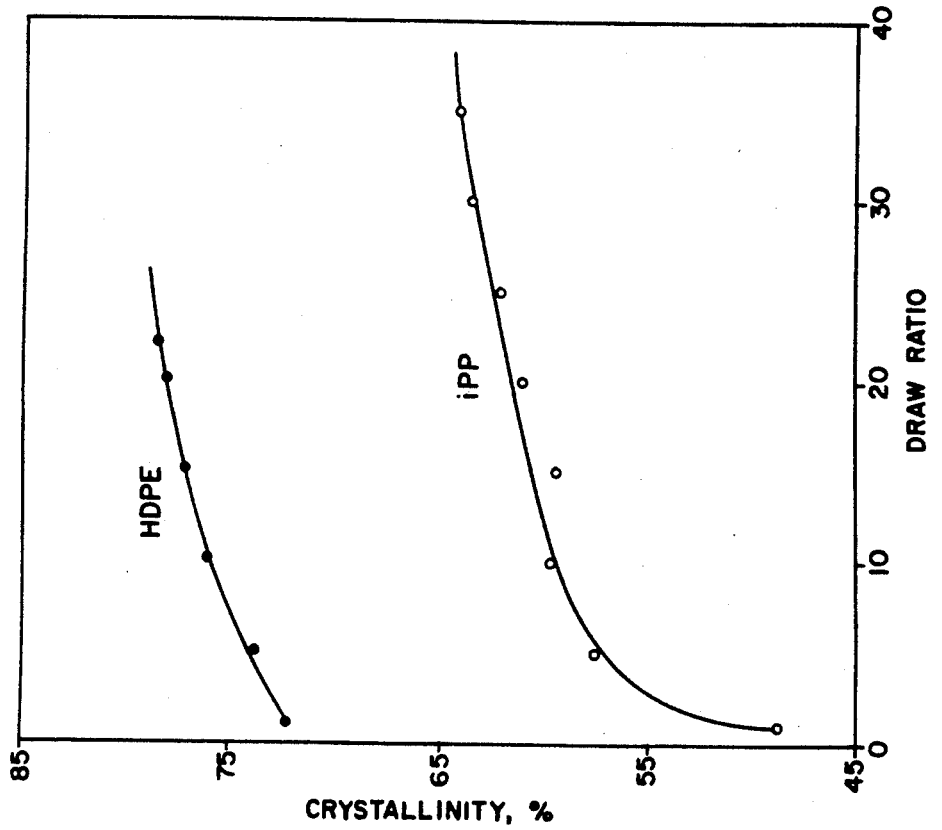
FIG. 7 is a plot of the percent crystallinity of HDPE and iPP shown as a function of draw ratio for several sets of processing conditions.

Crystallinity values determined from DSC, are plotted in FIG. 7. The degree of crystallinity was determined as the ratio of the enthalpy change at melting transition to the heat of fusion for an ideal crystal (69 cal/g and 38 cal/g were used for HDPE and iPP, respectively). Density measurements were also made for the doubly oriented specimens, but here too the density of the amorphous phase, which is a function of draw ratio (or orientation), must be properly assigned before the degree of crystallinity can be calculated accurately.

Birefringence

Figure 8:
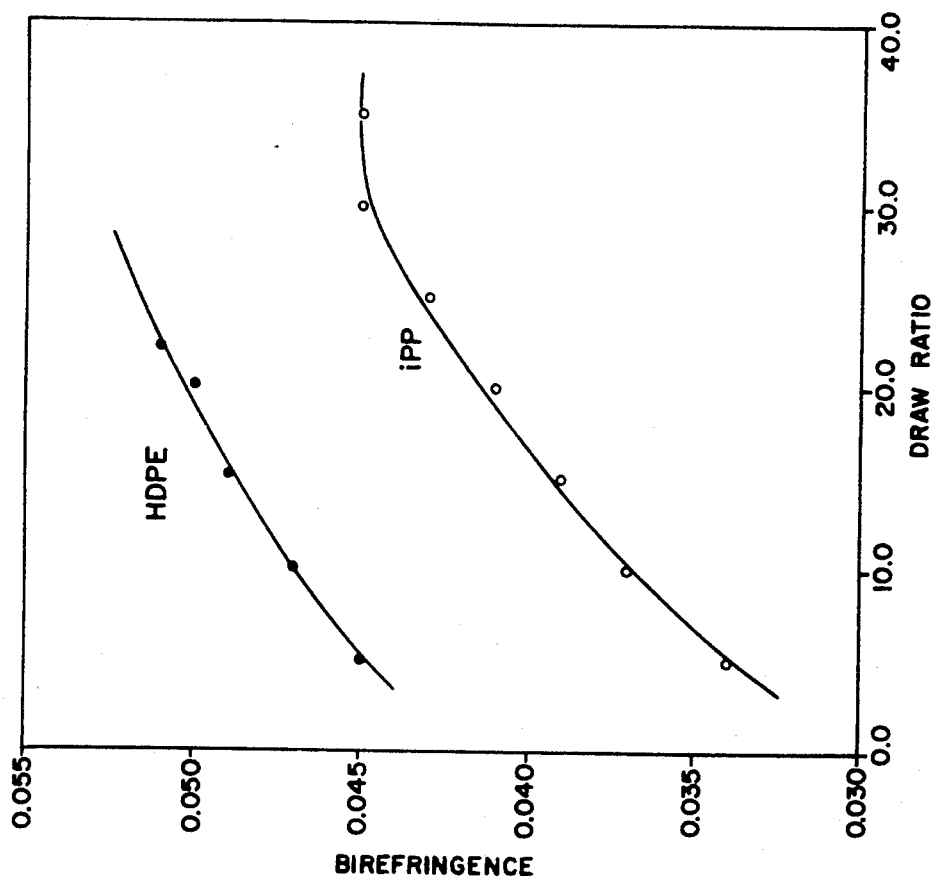
FIG. 8 is a plot of the birefringence values of doubly oriented HDPE and iPP samples as a function of draw ratio.

Sample birefringence as a function of draw ratio is shown in FIG. 8. In both the doubly oriented HDPE and iPP samples, the $\Delta n_{yz}$ and $\Delta n_{xz}$ values were virtually identical for a given draw ratio because the difference of the principle refractive indices, $n_a$ and $n_b$, is very small in both polyolefins.

Degree of Orientation

Figure 12:
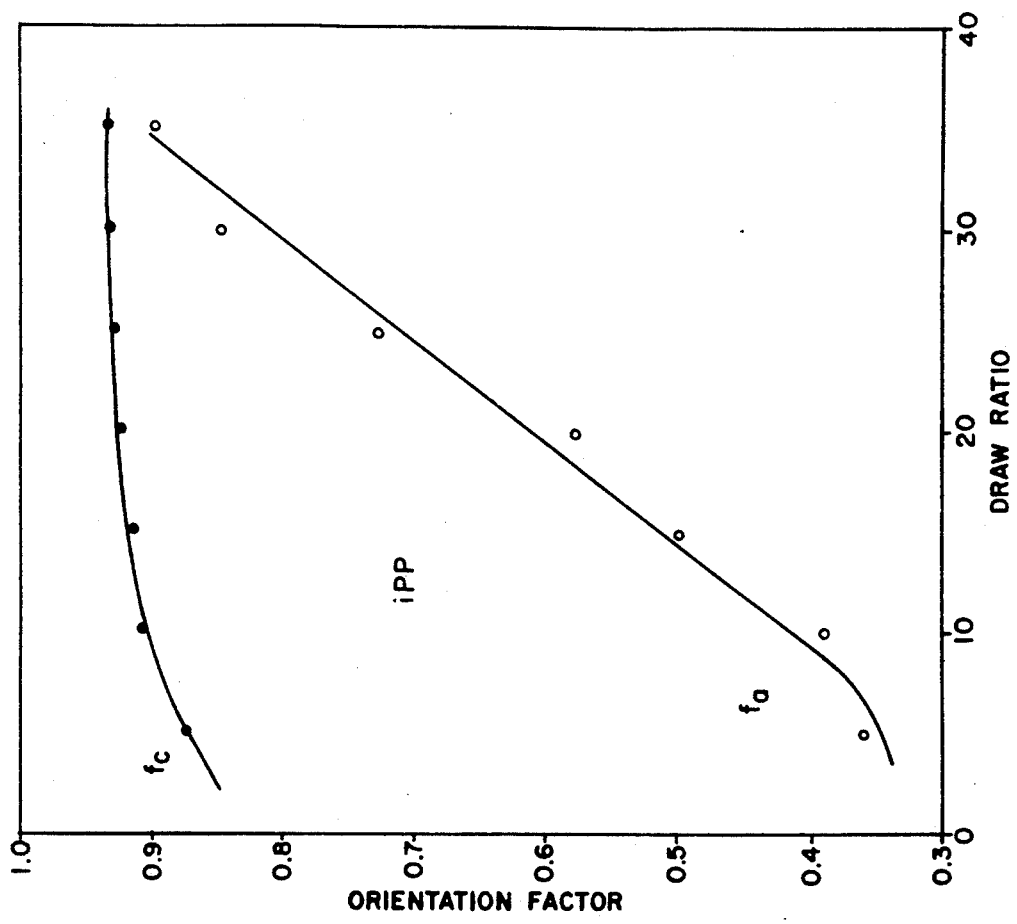
FIGS. 11 and 12 are plots of the Orientation Factors, for both amorphous (fa) and crystalline (fu) forms, for HDPE and iPP, respectively, as a function of draw ratio.
Figure 11:
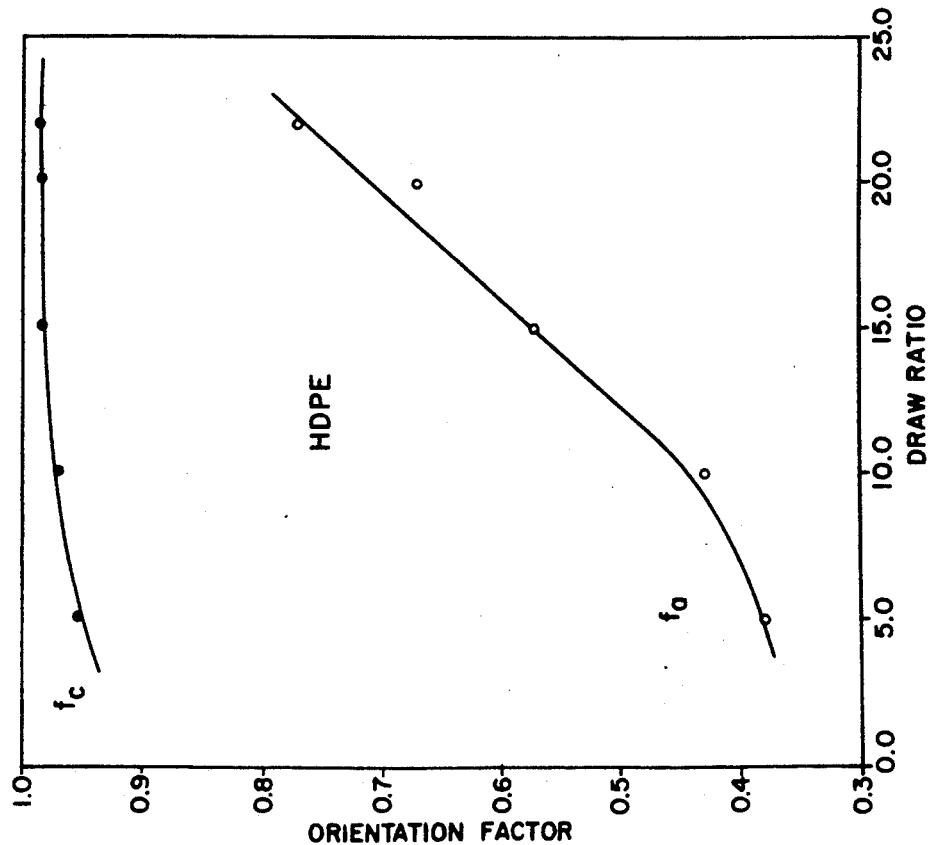

The degree of orientation for the crystallites, $f_c$, was determined from WAXS data, using the Hermann's function. The degree of orientation for the amorphous phase, $f_a$, was calculated based upon birefringence measurements along with $f_c$ results, assuming Stein's additivity equation to be valid. FIGS. 11 and 12 show the variations of $f_c$ and $f_a$, with draw ratio, for the two polyolefins. Both factors increase with increasing draw ratio, but $f_c$ tends towards an asymptotic (limiting) value at high DR values, while $f_a$ is found to increase steadily, suggesting that the intercrystallite materials play a very important role in the enhancement of mechanical properties.

Gel Permeation Chromatography

GPC measurements were made in order to monitor the changes in molecular weight and molecular weight distribution upon deformation. It is clear that no significant changes in the molecular weight distribution occurred during processing. Consequently, the commercial HDPE and iPP samples did not undergo thermomechanical degradation upon rolltrusion so that this procedure appears to be of technological value. In like manner, its utility for several other commercial plastics has been verified and these results will be reported shortly.

Mechanical Properties

The tensile properties of the original and the doubly oriented HDPE and iPP polymers were determined along the roll direction. The details of the testing conditions and the calculation of tensile properties such as modulus, strength, elongation at break and fracture toughness were outlined earlier.

A. The Calculation of Tensile Properties

All tensile properties were calculated using the procedure outlined in the ASTM Test Method D-638;
(a) Tensile Strength (psi)—load applied to the specimen divided by the cross-sectional area;
(b) Tensile Modulus of Elasticity (psi)—the slope of the straight line portion of the load-strain curve divided by the cross-sectional area;
(c) Elongation at break (in/in)—increase in the gage length at the point of fracture divided by the original sample gage length; and
(d) Fracture Toughness—it is the measure of the area under the load-strain curve until fracture divided by the cross-sectional area of the sample.

The invention is now further described by way of example for several polymeric materials.

EXAMPLE 1

Commercial isotactic polypropylene, as extruded sheet (Boltaron 5500), was cut into billets for double orientation. A variety of thickness from ⅛" to ½" and sometimes greater were processed by the rolltrusion method as follows. The polypropylene workpiece was introduced between thermostatted rollers, and the existing end of the workpiece was clamped in a constant speed drawing device (which had a variable drive and variable tension or load capability, that could be used as the need arose). The load on the clamped workpiece was adjusted as it was pulled between the rollers until the desired thickness at exiting and properties were reached. The drawing speed was about 0.3 cm min$^{-1}$, and a draw temperature of 158° C., were such that they, and roller compression of desired dimensions, produced highly doubly oriented transparent plastic from the opaque commercial sample. The cross sectional area of the product could be controlled, as required, covering changes in cross section of the original workpiece from ×2 up to ×60 to 1 in a single pass through the double orientating assembly.

After passage between the rollers, the polypropylene was rectangular (strap-like) in shape. The Young's modulus of elasticity, the tensile strength and toughness of the polymer were characterized. For a typical commercial workpiece of polypropylene, $M_w$=371,000 and $M_n$=65,000, for example, and draw ratio (DR)=×35, for example, the Young's modulus enhancement could be in excess of $2.5 \times 10^6$ psi, the tensile strength $7 \times 10^4$ psi, and the toughness with respect to the starting material. At the same time, the elongation of the processed product was typically below 5%, i.e., manifold reduction, so that elongation or creep of the doubly-oriented polymer with respect to the original workpiece was significantly changed for better use in many practical applications, where elongation/creep have proven to be a problem in end use applications.

At drawing ratio (DR) values approaching $\times 30$, and well above this, the (b) axis of the polypropylene was oriented perpendicular to the roll plane (broad face) of the product which had now become highly transparent. The (c) molecular chain direction was now aligned in the draw, or stretch direction, and the (a) direction of the crystallites was oriented transverse to the rolling direction. These facts signified that true double-orientation (or triaxial orientation) had occurred. The measured X-ray orientation factor, birefringence, sample density and crystallinity were all enhanced significantly through this double-orientation processing.

EXAMPLE 2

In this illustration, isotropic commercial (high density Boltaron 5200) polyethylene of $M_w = 91,900$ $M_n = 13,900$ was again cut into billets and doubly-oriented by drawing between the roller surfaces. The setup procedure was similar to that cited in Example 1, except that the processing conditions, particularly temperature was considerably lower. The rolltrusion operation was similar to the polypropylene example, and the workpiece was processed to strip-like dimensions of high clarity, strength, modulus, draw ratio and orientation. Typical values for a draw ratio of x 25 are tabulated. This illustration does not represent an upper limit on processability, but it only serves as an example.

For thick workpieces, as in polypropylene too, it may be desirable to preneck the work specimen, before placing it subsequently between the rollers of the double orientation equipment. After clamping the workpiece on the exiting (drawing) side from the rollers, the polymer is drawn and compressed simultaneously into an elongated strip. Tension and draw speed were selectively altered to reach the desired DO dimensions and qualities in the processed product.

In this example of high density commercial polyethylene, doubly-oriented at 120°, drawn to a DR=22, the results were: Young's Tensile modulus ($10^6$ psi)=3.5; Tensile strength ($10^5$ psi)=2.0; and Elongation=5%. (See FIGS. 5 and 9)

EXAMPLE 3

In this example, unoriented Nylon 6, colored (blue dyed), billets (from Cadillac Plastics, Pittsburgh) were cut from a ½" sheet of Nylon 6 plastic, prenecked, and then subjected to rolltrusion at elevated temperatures, which were well above the conditions used for processing polypropylene. In a single operation at 205° C., for example, Nylon 6 workpiece was converted to highly doubly oriented plastic, with enhanced physical properties and improved wear resistance, demonstrating that the product was capable of much improved quality and improved characteristics as an engineering plastic. An example of sample qualities for a DR=6.5 are illustrated in Table 10.

EXAMPLE 4

Commercial sheets of amorphous polyethyleneterephthalate (PET), which is a crystallizable polymer, were processed at not too far removed from their glass transition temperature. Two different examples, one (a) with a workpiece ½" wide, and another (b) a workpiece 5 ¼" wide were used. With (a), the rollers were heated and stationary, whereas with (b) they were cold (i.e., kept at room temperature) but the workpiece was preheated before passing through the roller nip which was adjusted to obtain product thickness as required. The workpiece in (b) was comprised of a sheet roll longer than (50 ft.) of amorphous PET, purposely tested to demonstrate the continuous nature of operation.

To illustrate the quality of the product produced, it is pointed out, that for a doubly oriented PET of DR=X10, the X-ray, density and DSC crystallinity are considerably enhanced during rolltrusion processing. The tensile modulus, and tensile strength, jump by a factor of X10 - and X6 -, respectively. The clarity of the PET was not impaired through the crystallization, which occurs during the double orientation operation, or even after subsequently annealing the doubly oriented product at about 180° C., where its maximum rate of crystallization approximately. By way of contrast, the unoriented relaxed (originally clear amorphous PET) becomes milky white when heated and maintained 180° C. for 1 hr., indicating that a clear advantage is to be gained via the double orientation processing described in this example.

All polymers tested in these examples were characterized by small and wide angle X-ray diffraction. It was demonstrated that orientation and crystallinity of the doubly-oriented increased progressively, with conditions finally reaching a morphology in which the molecular chains, in crystalline and amorphous regions, were oriented along the stretch direction, and the other two crystallographic directions were oriented in, and perpendicular to, the rolling plane of the workpiece. At sufficiently high deformations, a monoclinic component was also noted along with predominant orthorhombic component in polyethylene. For polypropylene, the structure is monoclinic; and in PET, it is the usual triclinic structure which predominated.

FIG. 5 lists the tensile modulus values obtained from doubly oriented HDPE samples processed at 110° and 120° C. The tensile modulus, upon double orientation of commercial HDPE polymer, was enhanced by almost an order of magnitude i.e., from $1.7 \times 10^5$ psi for the original polymer to $3.8 \times 10^6$ psi for the highly doubly oriented HDPE sample (DR=22). Almost a linear increase in tensile modulus values was noted with increasing draw ratio.

Also presented in FIG. 5 are the tensile modulus values of the doubly oriented iPP samples processed at 150° and 158° C. These values were subsequently plotted as a function of draw ratio. (no table) Again, there was observed a significant increase in modulus values upon double orientation. The original iPP sample showed a value of $1.8 \times 10^5$ psi, while the highest drawn sample (DR=35) had an average value of $2.5 \times 10^6$ psi. The tensile modulus values of doubly oriented HDPE and iPP samples obtained in the present investigation were comparable to those obtained by other orientation techniques described earlier.

Figure 9:
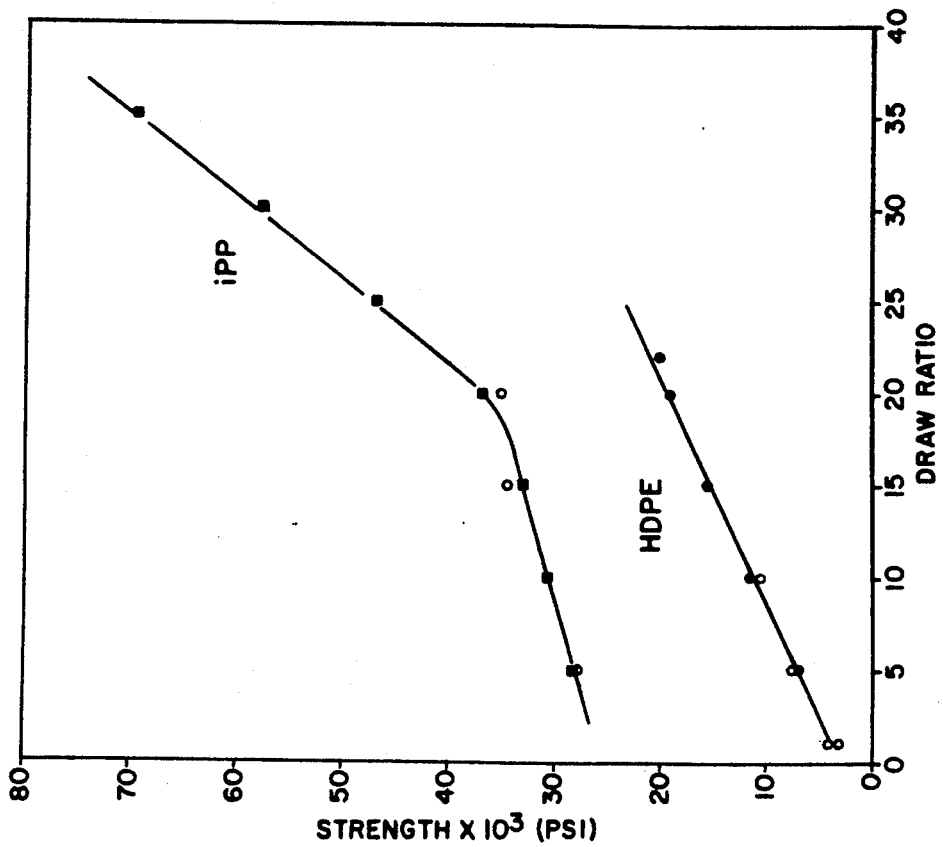
FIG. 9 presents the plots for tensile strength for HDPE and iPP as a function of draw ratio.

FIG. 9 presents the plotted tensile strength data on doubly oriented HDPE samples of various draw ratios. There was a plot of this data of the variation in tensile strength with draw ratio for HDPE samples doubly oriented at 110° and 120° C. The plot suggests almost a linear increase in tensile strength with increasing draw ratio. The original undrawn HDPE had a tensile strength of 3000 psi compared to the tensile strength of 20,000 psi for the doubly oriented HDPE (DR=22) sample.

The tensile strength values obtained from doubly oriented iPP samples are also plotted in FIG. 9. There was also a plot of tensile strength expressed as a function of draw ratio for the doubly oriented iPP specimens processed at 150° and 158° C. The tensile strength of the doubly oriented iPP samples was enhanced over the original polymer by at least a factor of 15. The original iPP had an average value of 4000 psi, while the doubly oriented sample (DR=35) showed a tensile strength of 69000 psi. However, no distinct trend was evident with respect to the draw temperatures and draw speeds used in this work.

Figure 10:
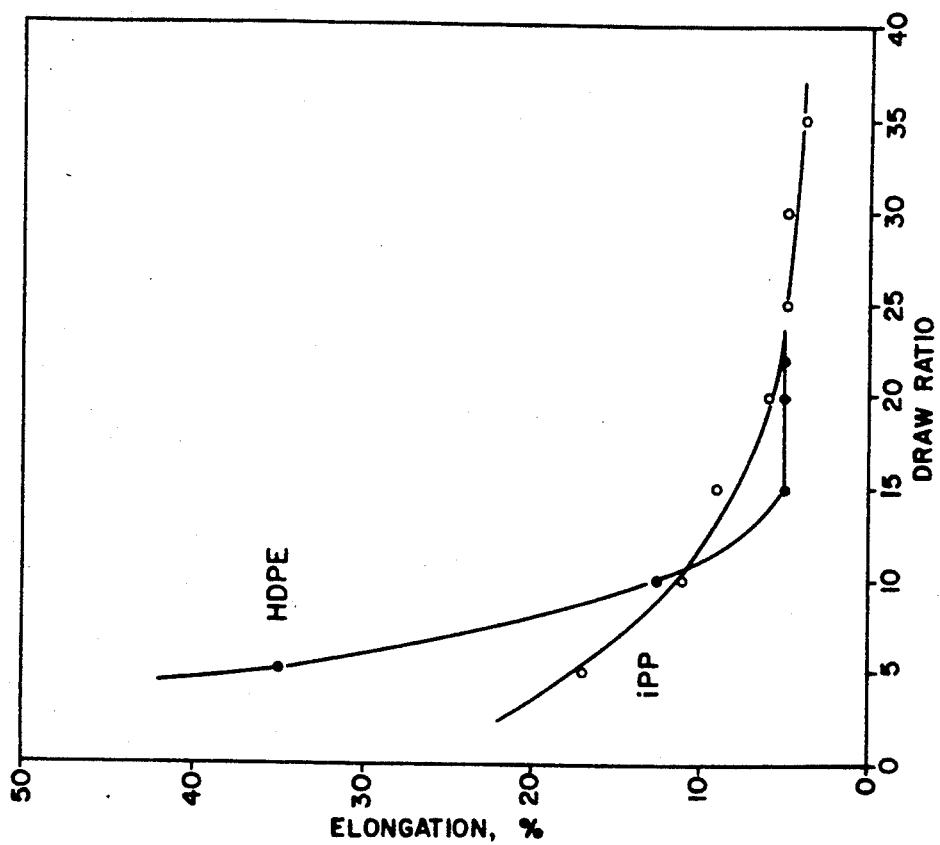
FIG. 10 presents the plots for percent elongation at break of HDPE and iPP as a function of draw ratio.

There was a plot made of measured values that show the effect of draw ratio on elongation-at-break for the doubly oriented HDPE and iPP. The values of elongation at break used are listed in FIG. 10. An exponential decrease in percent elongation occurs upon double orientation. Initially, HDPE and iPP samples showed an elongation at break values of 1250% and 590% respectively. In contrast, the doubly oriented HDPE sample (DR=22) exhibited only 5% elongation before fracture, and doubly oriented iPP (DR=35) showed an elongation at break of 4%. The transition from a ductile to a brittle behavior with increasing double orientation can be explained on the basis of microfibrillar model, wherein the presence of tie molecules associated or created by a high degree of molecular orientation severely restricts shear deformation of microfibrils thus leading to a brittle failure.

The influence of draw ratio on fracture toughness of double oriented HDPE and iPP samples were shown in a plot of data. The toughness values, as determined from the area under the stress strain curve for the doubly oriented HDPE and iPP samples, are listed in Table 11. The fracture toughness of doubly oriented HDPE decreased to as low as 9 mm² from 204 mm², on increasing the draw ratio from 5 to 22. Similarly, for iPP the fracture toughness decreased from 49 mm² to 7 mm², upon increasing the draw ratio from 5 to 35.

Finally, in Table 12 is presented some representative physical data for each of the polyolefins that were extensively studied, indicating the correlation of long period spacing, percent crystallinity and melting point, for the original polymers, and after useful processing according to the present invention.

It has thus been established by this array of data as presented in the tables that:
(a) Maximum draw ratio is a function of draw temperature and roller gap, but is independent of draw speed in the range cited;
(b) The average size of the polymer crystallites increased with increasing draw ratio;
(c) DSC traces of doubly oriented polymers exhibited sharper melting profiles and higher melting points as compared to the original polymer billets;
(d) Birefringence measurements have indicated a high degree of molecular orientation in both the crystalline and amorphous regions;
(e) GPC studies showed no signs of thermomechanical degradation during processing to form doubly oriented polymers; and
(f) For the samples, the tensile modulus values and the tensile strength of these polymers were significantly better than the commercial polyolefins.

Rolltrusion has proved to be a useful technique for the preparation of highly doubly oriented polymers from commercial plastics. Doubly oriented HDPE and iPP samples with tensile modulus values up to $3.8 \times 10^6$ and $2.5 \times 10^6$ psi, respectively, were obtained readily. Tensile strength of these polymers were much more than an order of magnitude better than the values found for the starting polymers. These mechanical properties are found to be increased by more than an order of magnitude depending upon the molecular weight and molecular distribution of the starting material.

It is generally found that the higher the mean molecular weight, the higher will be the tensile strength and modulus of the double oriented specimen(s) obtained through rolltrusion. Creep was significantly reduced in these processed polymers too, so that their utility was greatly enhanced for many industrial applications. WAXS and SAXS patterns, along with TEM and SEM micrographs have shown that the polymer crystallites are oriented with their c-axis along the draw direction and a low index plane parallel to the roll surface.

TABLE 1

TENSILE MODULUS VALUES OF SELECTED CRYSTALLINE POLYMERS AND OTHER ENGINEERING MATERIALS

| Material | Tensile Modulus (psi) |
|---|---|
| Commercial | |
| High density polyethylene | $1.4 \times 10^5$ |
| Polypropylene | $1.8 \times 10^5$ |
| Nylon 6 | $7.2 \times 10^5$ |
| Theoretical | |
| High density polyethylene | $3.5 \times 10^7$ |
| Polypropylene | $6.1 \times 10^6$ |
| Nylon 6 | $3.6 \times 10^6$ |
| Others | |
| Kevlar | $1.9 \times 10^7$ |
| Glass | $1.0 \times 10^7$ |
| Steel | $2.9 \times 10^7$ |

TABLE 2

DOUBLY ORIENTED POLYMERS

PROCESSING CONDITIONS     MORPHOLOGICAL CHARACTERIZATION     MECHANICAL PROPERTIES

TABLE 2-continued

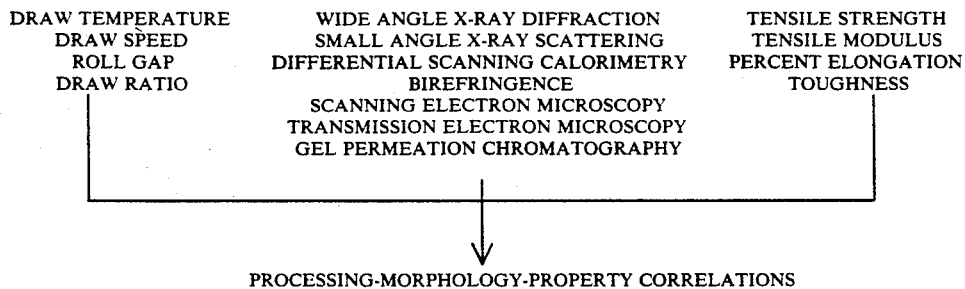

| DRAW TEMPERATURE | WIDE ANGLE X-RAY DIFFRACTION | TENSILE STRENGTH |
| --- | --- | --- |
| DRAW SPEED | SMALL ANGLE X-RAY SCATTERING | TENSILE MODULUS |
| ROLL GAP | DIFFERENTIAL SCANNING CALORIMETRY | PERCENT ELONGATION |
| DRAW RATIO | BIREFRINGENCE | TOUGHNESS |
|  | SCANNING ELECTRON MICROSCOPY |  |
|  | TRANSMISSION ELECTRON MICROSCOPY |  |
|  | GEL PERMEATION CHROMATOGRAPHY |  |

PROCESSING-MORPHOLOGY-PROPERTY CORRELATIONS

TABLE 3
PHYSICAL AND MECHANICAL PROPERTIES OF THE STARTING HDPE AND iPP PLASTICS

| PROPERTY | POLYETHYLENE (Boltaron 5200) | POLYPROPYLENE (Boltaron 5500) |
| --- | --- | --- |
| Melting pt. (°C.) | 133.5 | 161.0 |
| Crystallinity | 72.25% | 48.8% |
| Crystal structure | orthorhombic | monoclinic |
| Longperiod spacing | 170.0 A | 180.0 A |
| Tensile strength | 3020 psi | 4080 psi |
| Tensile modulus | $1.7 \times 10^5$ | $1.8 \times 10^5$ |
| Elongation | 1250% | 585% |

TABLE 4
PROCESSING CONDITIONS USED IN THE PREPARATION OF DOUBLY ORIENTED HDPE AND iPP

| SAMPLE NO. | MATERIAL | DRAW TEMP. (°C.) | DRAW SPEED (MM/MIN) | DRAW RATIO |
| --- | --- | --- | --- | --- |
| 1 | iPP | 140 | 2.60 | 5.0 |
| 2 | iPP | 140 | 26.00 | 5.0 |
| 3 | iPP | 140 | 2.60 | 10.0 |
| 4 | iPP | 140 | 18.50 | 10.0 |
| 5 | iPP | 140 | 26.00 | 10.0 |
| 6 | iPP | 150 | 2.60 | 5.0 |
| 7 | iPP | 150 | 9.00 | 5.0 |
| 8 | iPP | 150 | 18.50 | 5.0 |
| 9 | iPP | 150 | 26.00 | 5.0 |
| 10 | iPP | 150 | 2.60 | 10.0 |
| 11 | iPP | 150 | 9.00 | 10.0 |
| 12 | iPP | 150 | 18.50 | 10.0 |
| 13 | iPP | 150 | 26.00 | 10.0 |
| 14 | iPP | 150 | 2.60 | 15.0 |
| 15 | iPP | 150 | 9.00 | 15.0 |
| 16 | iPP | 150 | 18.50 | 15.0 |
| 17 | iPP | 150 | 26.00 | 15.0 |
| 18 | iPP | 150 | 2.60 | 20.0 |
| 19 | iPP | 150 | 9.00 | 20.0 |
| 20 | iPP | 150 | 18.50 | 20.0 |
| 21 | iPP | 150 | 26.00 | 20.0 |
| 22 | iPP | 158 | 2.60 | 5.0 |
| 23 | iPP | 158 | 26.00 | 5.0 |
| 24 | iPP | 158 | 2.60 | 10.0 |
| 25 | iPP | 158 | 26.00 | 10.0 |
| 26 | iPP | 158 | 2.60 | 15.0 |
| 27 | iPP | 158 | 26.00 | 15.0 |
| 28 | iPP | 158 | 2.60 | 20.0 |
| 29 | iPP | 158 | 26.00 | 20.0 |
| 30 | iPP | 158 | 2.60 | 25.0 |
| 31 | iPP | 158 | 26.00 | 25.0 |
| 32 | iPP | 158 | 2.60 | 30.0 |
| 33 | iPP | 158 | 2.60 | 35.0 |
| 34 | HDPE | 100 | 2.60 | 5.0 |
| 35 | HDPE | 100 | 9.00 | 5.0 |
| 36 | HDPE | 100 | 18.50 | 5.0 |
| 37 | HDPE | 100 | 26.00 | 5.0 |
| 38 | HDPE | 110 | 2.60 | 5.0 |
| 39 | HDPE | 110 | 9.00 | 5.0 |
| 40 | HDPE | 110 | 18.50 | 5.0 |
| 41 | HDPE | 110 | 26.00 | 5.0 |
| 42 | HDPE | 110 | 2.60 | 10.0 |
| 43 | HDPE | 110 | 9.00 | 10.0 |
| 44 | HDPE | 110 | 18.50 | 10.0 |
| 45 | HDPE | 110 | 26.00 | 10.0 |
| 46 | HDPE | 120 | 2.60 | 5.0 |
| 47 | HDPE | 120 | 9.00 | 5.0 |
| 48 | HDPE | 120 | 18.50 | 5.0 |
| 49 | HDPE | 120 | 26.00 | 5.0 |
| 50 | HDPE | 120 | 2.60 | 10.0 |
| 51 | HDPE | 120 | 9.00 | 10.0 |
| 52 | HDPE | 120 | 18.50 | 10.0 |
| 53 | HDPE | 120 | 26.00 | 10.0 |
| 54 | HDPE | 120 | 2.60 | 15.0 |
| 55 | HDPE | 120 | 26.00 | 15.0 |
| 56 | HDPE | 120 | 2.60 | 20.0 |
| 57 | HDPE | 120 | 2.60 | 22.0 |

TABLE 5
VARIATION OF MAXIMUM DRAW RATIO WITH DRAW TEMP. FOR iPP ($S_d$ = 2.6 MM/MIN.)

| Draw Temperature (°C.) | Max. Draw Ratio |
| --- | --- |
| 140 | 12.5 |
| 145 | 15.0 |
| 150 | 20.5 |
| 155 | 27.0 |
| 158 | 35.0 |
| 161 | 60.0 |

TABLE 6
VARIATION OF MAXIMUM DRAW RATIO WITH DRAW TEMP. FOR HDPE ($S_d$ = 2.6 MM/MIN.)

| Draw Temperature (°C.) | Max. Draw Ratio |
| --- | --- |
| 100 | 6.5 |
| 110 | 10.0 |
| 115 | 16.5 |
| 120 | 22.0 |
| 123 | 25.0 |

TABLE 7
LONG PERIOD SPACING VALUES OF DOUBLY ORIENTED HDPE & iPP ($DR_{max}$ = 10)

| Sample No. | Long Period Spacing (A) |
| --- | --- |
| Polypropylene | |
| 6 | 228 |
| 10 | 247 |
| 22 | 228 |
| 23 | 228 |
| 24 | 247 |
| 25 | 247 |

TABLE 7-continued
LONG PERIOD SPACING VALUES OF DOUBLY ORIENTED HDPE & iPP ($DR_{max}$ = 10)

| Sample No. | Long Period Spacing (A) |
|---|---|
| Polyethylene | |
| 38 | 249 |
| 42 | 269 |
| 46 | 249 |
| 49 | 249 |
| 50 | 269 |
| 53 | 269 |

TABLE 8
MELTING POINT DATA ON DOUBLY ORIENTED HDPE & iPP

| Sample No. | Melting Pt. (K) |
|---|---|
| Polypropylene | |
| 1 | 434.5 |
| 6 | 434.5 |
| 9 | 434.5 |
| 10 | 435.0 |
| 13 | 435.0 |
| 14 | 436.0 |
| 17 | 436.0 |
| 18 | 436.5 |
| 21 | 436.5 |
| 22 | 434.5 |
| 24 | 434.5 |
| 26 | 436.0 |
| 28 | 436.5 |
| 30 | 437.0 |
| 32 | 438.0 |
| 33 | 438.5 |
| Polyethylene | |
| 34 | 407.5 |
| 37 | 407.5 |
| 38 | 407.5 |
| 41 | 407.5 |
| 42 | 409.0 |
| 45 | 409.0 |
| 46 | 407.5 |
| 49 | 407.5 |
| 50 | 409.0 |
| 53 | 409.0 |
| 54 | 410.0 |
| 55 | 410.0 |
| 56 | 411.0 |
| 57 | 411.3 |

TABLE 9
MOLECULAR WEIGHT AND MOLECULAR WEIGHT DISTRIBUTION DATA FOR THE ORIGINAL AND THE DOUBLY ORIENTED HDPE & iPP

| Material | Draw Ratio | $M_n$ | $M_w$ | $M_w/M_n$ |
|---|---|---|---|---|
| Polyethylene | Original | 13900 | 91900 | 6.6 |
| Polyethylene | 20 | 11300 | 91200 | 8.0 |
| Polypropylene | Original | 65600 | 413000 | 6.3 |
| Polypropylene | 35 | 70000 | 371000 | 5.3 |

TABLE 10
COMPARISON OF ORIGINAL WORKPIECE AND DOUBLY ORIENTED NYLON 6

| Draw ratio | U.T.S. $10^3$ psi | Tensile Mod. $10^4$ psi | Elongation % at break | Fracture Toughness (rel units) |
|---|---|---|---|---|
| 1 | 13.05 | 50.05 | 31.5 | 4560 |
| 6.5 | 36.0 | 71.5 | 7.9 | 1254 |

TABLE 11
FRACTURE TOUGHNESS VALUES OF DOUBLY ORIENTED HDPE & iPP

| Sample No. | Fracture Toughness |
|---|---|
| Polypropylene | |
| 1 | 49.0 |
| 6 | 45.0 |
| 10 | 24.0 |
| 13 | 25.0 |
| 14 | 18.0 |
| 18 | 11.0 |
| 21 | 10.0 |
| 22 | 52.0 |
| 24 | 27.0 |
| 26 | 20.0 |
| 28 | 14.0 |
| 30 | 10.0 |
| 32 | 6.0 |
| 33 | 7.0 |
| Polyethylene | |
| 34 | 204.0 |
| 38 | 195.0 |
| 42 | 56.0 |
| 46 | 220.0 |
| 49 | 213.0 |
| 50 | 67.0 |
| 53 | 72.0 |
| 54 | 35.0 |
| 56 | 12.0 |
| 57 | 9.0 |

TABLE 12

| | Orig. HDPE | Doubly Oriented HDPE | Orig. iPP | Doubly Oriented iPP |
|---|---|---|---|---|
| Long period spacing (A) | 170 | 629 | 180 | 247 |
| Percent Crystallinity (%) | 72.2 | 78.5 | 48.8 | 64.12 |
| Melting Pt. (K) | 406.5 | 411.20 | 434 | 438.5, 443.5 |

We claim:

1. A triaxial crystallite oriented synthetic polymeric material prepared from an orientable semi-crystalline thermoplastic polymeric workpiece according to a process comprising
   (a) presenting the workpiece, being of essentially unoriented polymers, at the entry mode of an operating pair of solid rollers that are spaced apart a distance substantially less than the thickness of the workpiece; and
   (b) simultaneously compressing and drawing the workpiece in a single step through the paired rollers to deform the workpiece by compressive passage through the paired rollers at a nominal deformation ratio of at least 2 to 1, wherein the deformation is carried out between the glass transition temperature and the melting point of the polymeric material by applying to the workpiece, from the exit side of the paired rollers, a draw tension insufficient to cause tensile failure of the workpiece but sufficient to impart triaxial crystallite orientation to the polymeric material and to effect a draw ratio greater than the natural draw ratio of the polymeric material, such that molecular deformation, molecular alignment, and the molecular extension occur in the workpiece above the natural draw ratio otherwise attainable in the workpiece.

2. The triaxial crystallite oriented synthetic polymeric material of claim 1 wherein the material is a homo- or copolymer of one of ethylene or propylene monomers.

3. The triaxial crystallite oriented synthetic polymeric material of claim 1 wherein the material is nylon 6.

4. The triaxial crystallite oriented synthetic polymeric material of claim 1 wherein the material is polyethylene terephthalate.

* * * * *